United States Patent [19]

Danz et al.

[11] Patent Number: 4,543,520

[45] Date of Patent: Sep. 24, 1985

[54] INDUCTION MOTOR SLIP CONTROL

[75] Inventors: George E. Danz, Radford; C. Calvin Shuler, Salem, both of Va.

[73] Assignee: Kollmorgen, Technologies Corporation, Dallas, Tex.

[21] Appl. No.: 567,339

[22] Filed: Dec. 30, 1983

[51] Int. Cl.[4] .............................................. H02P 5/40
[52] U.S. Cl. .................................... 318/807; 318/811
[58] Field of Search ........................ 348/811, 807–810, 348/803

[56] References Cited

U.S. PATENT DOCUMENTS

| 3,477,002 | 11/1969 | Campbell | 318/801 |
| 3,899,725 | 8/1975 | Plunkett | 318/758 |
| 3,983,463 | 9/1976 | Nabae et al. | 318/803 |
| 4,263,542 | 4/1981 | Schulze et al. | 318/803 |
| 4,281,276 | 7/1981 | Cutler et al. | 318/803 |
| 4,377,779 | 3/1983 | Plunkett | 318/811 |
| 4,456,868 | 6/1984 | Yamamura et al. | 318/800 |
| 4,459,534 | 7/1984 | Nagase et al. | 318/811 |

Primary Examiner—David Smith, Jr.
Attorney, Agent, or Firm—Morgan, Finnegan, Pine, Foley & Lee

[57] ABSTRACT

A variable frequency AC induction motor servo control system wherein slip is generated as a function of stator current. In a preferred embodiment the slip per ampere ratio is constant in the range from zero to approximately base speed and thereafter increases exponentially as the rotor speed increases above base speed.

2 Claims, 3 Drawing Figures

INDUCTION MOTOR SLIP CONTROL

This invention relates to a motor control system for induction motors, and more particularly, to an improved method and apparatus in an induction motor servo control system for synthesizing the slip at which the motor operates to optimize torque for a set of given conditions.

BACKGROUND OF THE INVENTION

DC motors have generally been utilized in variable speed applications because of the ability to accurately control such motors over a broad range of speeds and conditions. In DC motors the winding current controls the motor torque and can be directly measured to achieve accurate control for the desired operation.

In an AC induction motor the torque is a function of induced current in the rotor which in turn is a function of slip, i.e., the difference in speed between the rotor and the rotating magnetic field produced by the stator. The speed of the rotating magnetic field is determined by the frequency of the winding energizing current. However, due to the slip, the rotor speed differs therefrom by a variable amount related to the torque demands on the motor. Accurate control of rotor speed of an AC induction motor is difficult to achieve under variable torque conditions. Thus, even though AC induction motors are considerably less expensive than DC motors, they have generally not been used where accurate speed control is required.

One prior approach to servo speed control of induction motors is the "Transvector control" approach described, for example, in U.S. Pat. Nos. 3,593,083 and 3,824,437. Servo control of the induction motor is achieved by either sensing the magnetic field conditions in the motor airgap or in deriving the field vector values from the stator voltage and current vectors. An inverter is then controlled in accordance with the field vector values to supply an energizing signal to the motor having the desired phase, frequency and amplitude. Although this system functions well at running speed under load, this approach is characterized with poor control at low speeds. Under such conditions the magnetic fields in the motor are relatively weak or nonexistent and difficult to sense accurately. The calculated field vectors require integrations and therefore do not provide useful control information at zero speed. As a result, effective control based on the field vectors cannot be achieved at low speeds. Furthermore, excessive power usage at low speeds results in undesirable heating.

Another approach is disclosed in patent application Ser. No. 297,809 filed Aug. 31, 1981 by James S. Whited wherein slip factors are empirically determined for a particular motor and these slip factors are utilized to generate a synthesized sine wave energizing signal having the slip and amplitude required to produce the torque necessary for achieving servo speed control. The slip is a function of the difference between the desired speed and the actual speed, i.e., the velocity servo error. This approach eliminates the need for sensing or calculating the magnetic field vectors and provides effective control under load at running speed.

The later system, however, does experience some instability problems when operating under light loads. These problems are cured using techniques described in a companion application filed by the same inventors concurrently herewith and entitled "Control for Improving Induction Motor Transient Response." (403-46) The later approach also suffers from some control instability at higher speed, particularly in the range above the normal rated speed for the motor.

An object of this invention is to eliminate the aforementioned instability at higher speeds.

Another object is to provide an induction motor control system capable of effectively controlling speed over a range from zero to several times the rated speed of the motor.

SUMMARY OF THE INVENTION

In the system according to this invention, the stator current is measured and used to generate slip rather than using the velocity error signal. In theory, the velocity error should be proportional to stator current and, both, in turn should be proportional to slip and torque. In actual systems, however, these relationships do not always hold true with the result that the torque being developed may be insufficient to satisfy the speed command. A particularly troublesome operating region is where the motor supply reaches maximum potential and cannot immediately supply more stator current by increasing the applied voltage. Another difficulty arises because of the phase shift of the field vector relative to the energization vectors with the result that increasing slip can sometimes decrease torque rather than increase torque. The problems in these areas are substantially eliminated with the invention by generating slip as a function of stator current rather than velocity error or other control variables.

According to a preferred embodiment of the invention, the slip per ampere ratio is constant in the range from zero speed to approximately base speed and thereafter increases exponentially as the rotor speed increases above base speed. Base speed is the rotor speed above which the normal volts/Hertz relationship can no longer be maintained because the motor excitation voltage is approaching the maximum available power supply voltage. Usually the base speed corresponds to the rotor speed of the motor operating at rated conditions under load at the nominal line frequency (e.g. 60 Hertz). With the system according to the invention effective speed control has been achieved well above base speed. Optimum performance is achieved in the range above base speed by increasing the slip per ampere ratio by approximately the square (more preferably by a power of 1.9) of the difference between rotor speed and base speed.

DETAILED DESCRIPTION

Figure 1:
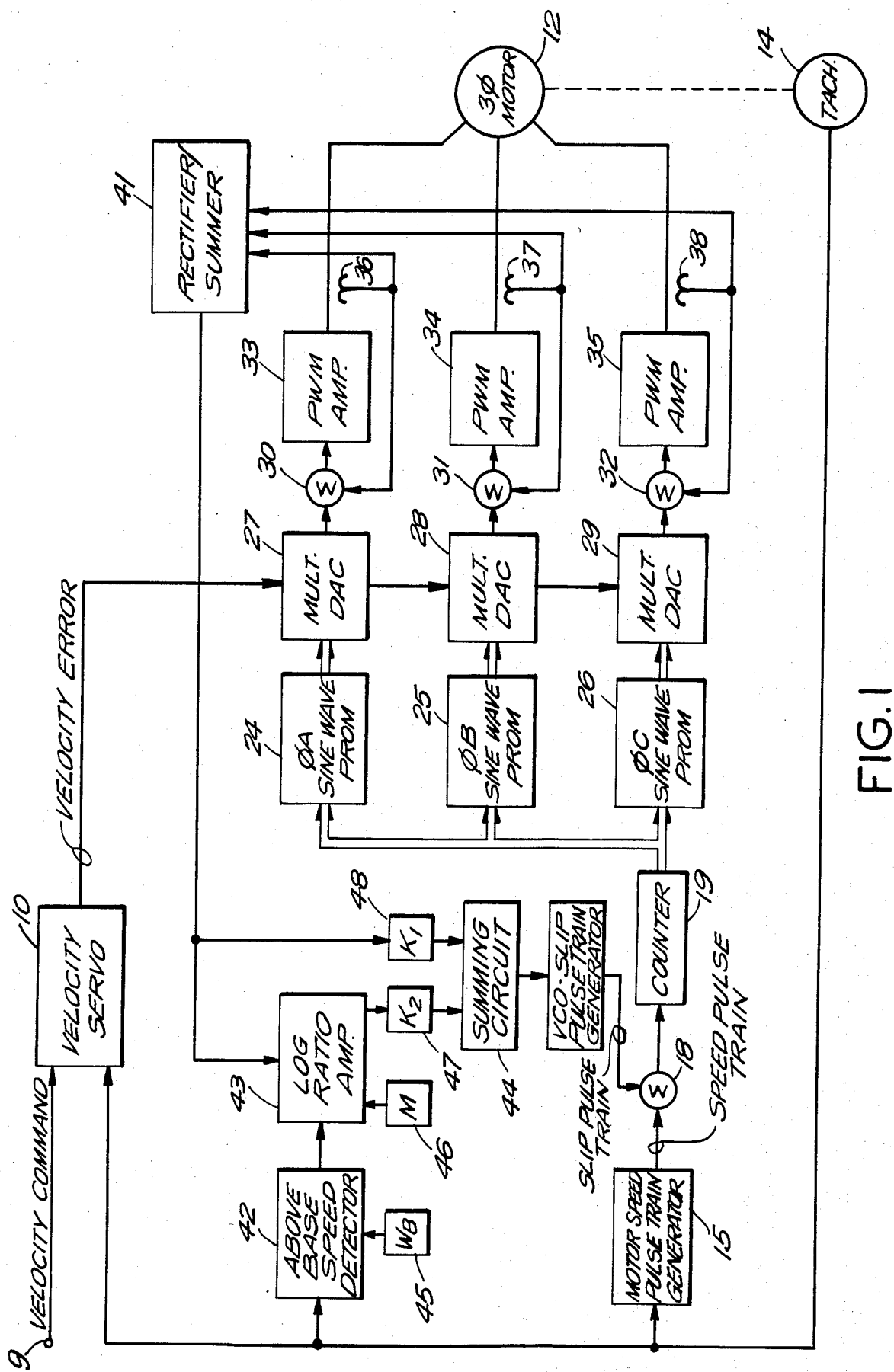
FIG. 1 is a block diagram of the overall system according to the invention.

FIG. 1 is a block diagram illustrating the overall system according to the invention for controlling a three-phase induction motor 12. A tachometer 14 is coupled to the motor shaft to provide a DC feedback proportional to rotor speed. The tachometer feedback is compared with a velocity command signal applied to terminal 9 in a velocity servo 10 to provide a velocity error. The remainder of the system operates to energize the motor with a three-phase current having the correct amplitutde and frequency for maintaining the speed dictated by the velocity command.

A motor speed pulse train generator 15 is responsive to the motor speed indication from tachometer 14 to provide a "speed pulse train" which is a serial pulse train wherein the pulse rate is proportional to rotor speed. In its simplest form, pulse generator 15 could be a voltage control oscillator (VCO) which produces output pulses at a rate proportional to the magnitude of the applied voltage.

Circuit 16 generates a second serial pulse train referred to as the "slip pulse train." The "speed pulse train" and the "slip pulse train" are combined in a pulse summing circuit 18. The number of pulses per second in the combined pulse train is either more or less than the number of pulses per second in the speed pulse train, the difference being the number of pulses per second in a slip pulse train. The combined pulse train is supplied to a counter 19 which converts the pulse train into a digital parallel format indicating vector position. If the counter is a typical 8 bit counter, then the counter output can indicate 256 different vector positions, i.e., the output would change from zero to 255 and then repeat.

The vector output from counter 19 is supplied as the address input to PROMS (programmable read only memories) 24–26 having sine values stored therein. These PROMS convert the digital vector position data into sine wave amplitude values. The sine values stored in the PROMS differ by 120 and 240 degrees so that the outputs of PROMS 24–26 have a three-phase displacement. The outputs of PROMS 24–26 pass through multiplying DAC's (digital to analog converters) 27–29, respectively, to provide analog sine waves. The velocity error signal from velocity servo 10 is supplied to each of the multiplying DAC's so that the amplitude of the sine wave outputs vary in accordance with the magnitude of the velocity error. Thus, the output of the DAC's 27–29 is a three-phase analog voltage signal having an amplitude proportional to the velocity error.

The voltage signal appearing at the output of the DAC's is then converted to a motor excitation current by PWM (pulse width modultion) amplifiers 33–35. Current sensors 36–38 sense the current magnitudes being supplied to motor 12 and provide corresponding feedback voltages to summing junctions 30–32. The feedback voltages are compared to the voltage outputs from DAC's 27–29 to derive an error signal which drives the PWM amplifiers to produce excitation currents for the motor corresponding to the voltage signals appearing at the outputs of DAC's 27–29.

Slip for the control system is synthesized by circuits 41–48 and supplied to a voltage controlled oscillator (VCO) 16 to provide the slip pulse train. More specifically, the current signals from current sensors 36–38 are supplied to a rectifier/summer circuit 41 where the signals are summed and rectified to provide a DC signal proportional to motor stator current. The output of circuit 41 is supplied to one input of a summing circuit 44 through a circuit 48 which multiplies the signal by the constant $K_1$. The output of circuit 41 is supplied to the other input of summing circuit 44 via a log ratio amplifier 43 and circuit 47 which multiplies the signal by the constant $K_2$. Summing circuit 44 adds the applied signal to derive a signal proportional to slip which is supplied to VCO to develop the "slip pulse train."

Above base speed detector circuit 42 compares the actual speed, as represented by a signal from tachometer 14, to the base speed represented by a constant voltage from base speed circuit 45. Circuit 42 produces a signal $\Delta s$ proportional to the difference between rotor speed and base speed whenever the rotor speed exceeds the base speed. The signal $\Delta s$, as well as the output of circuit 41, is supplied to log ratio amplifier 43 which produces an output corresponding to the product of the signal $\Delta s$ raised to the power M and the signal from circuit 41. The constant representing M is supplied by circuit 46. The value of M corresponds to approximately the power of 2.

Figure 3:
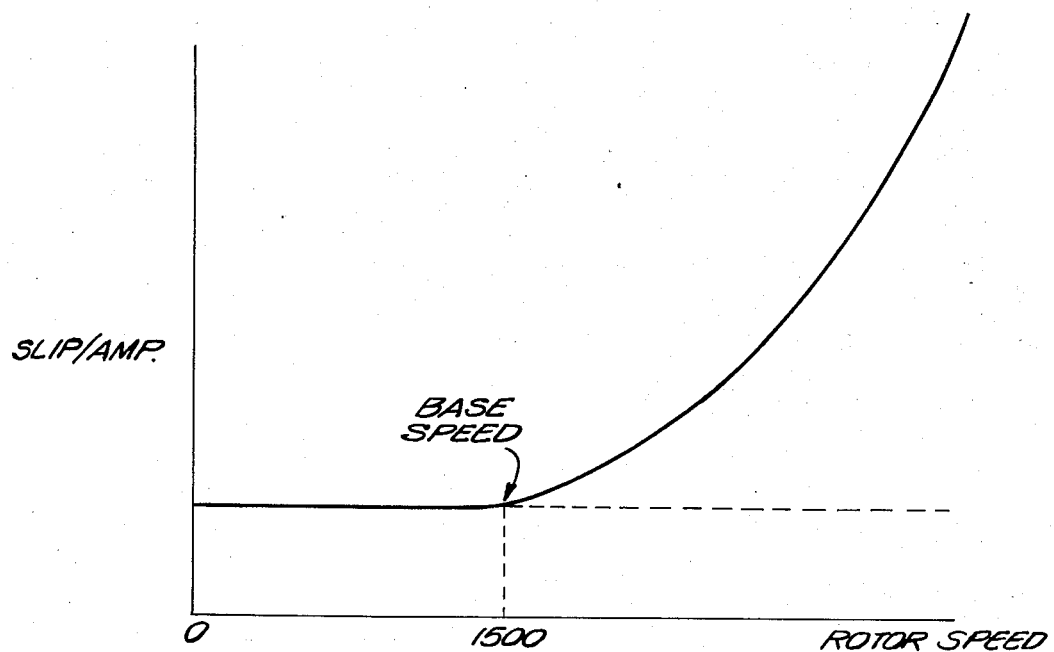
FIG. 3 is a diagram illustrating the relationship of slip/amperes to rotor speed.

The relationship between slip, stator current and rotor speed is illustrated in FIG. 3. In the range from zero to base speed, the output of the log ratio amplifier is zero or nearly zero and therefore slip is directly proportional to stator current. In other words, in this range the slip/ampere ratio is a constant determined by the setting of $K_1$ in circuit 48. Above base speed the log ratio amplifier superimposes an additional signal which increases exponentially (to the M power) as speed increases. Thus, as speed increases the increment of added slip per increment of current increase becomes larger. The superimposed component is determined by the values of $K_2$ and M from circuits 46 and 47.

The equation for the slip according to the invention is:

$$\text{Slip} = I_S K_1 + I_S K_2 [W_R - W_B]^M \text{ (For } W_R W_B)$$

$I_S$ = stator current
$K_1$, $K_2$, M = constants
$W_R$ = rotor speed
$W_B$ = base speed Base speed $W_B$ can be set as the rated operating speed of motor under load or, preferably determined by testing the motor on a dynamometer. If curves are plotted from dynamometer data showing slip values that produce maximum torque vs rotor speed at constant current, these curves will have the shape generally indicated in FIG. 3. The base speed corresponds to the point indicated where the curve begins to rise exponentially. This point is usually somewhat below the speed normally defined as base speed (full load running speed) because the system voltage is usually somewhat below rated voltage for the motor.

The constant $K_1$ can be determined from the same curves used in determining base speed. In the range below base speed, $K_1$ is the value which when multiplied by the stator current produces the slip value corresponding to maximum torque. The constant $K_2$ and M are determined in a similar fashion to get a fit for the curve in the region above base speed. Operation beyond the maximum torque values is undesirable and therefore the constants $K_1$ and $K_2$ should be backed down somewhat from the maximum values.

In a system controlling a three phase, four pole induction motor made by Baldor Electric Co. of Fort Smith, Ark., having a 186 volt line-to-line winding and a rated speed of 1760 RPM at 60 Hertz, the following parameters gave the best operating results:

$K_1$ = 0.02 Hertz/RMS static current
$K_2$ = 0.56 Hertz/RMS static current
M = 1.9
$W_B$ = 1000 RPM The motor was effectually controlled over a speed range of 0 to 6000 RPM.

Figure 2:
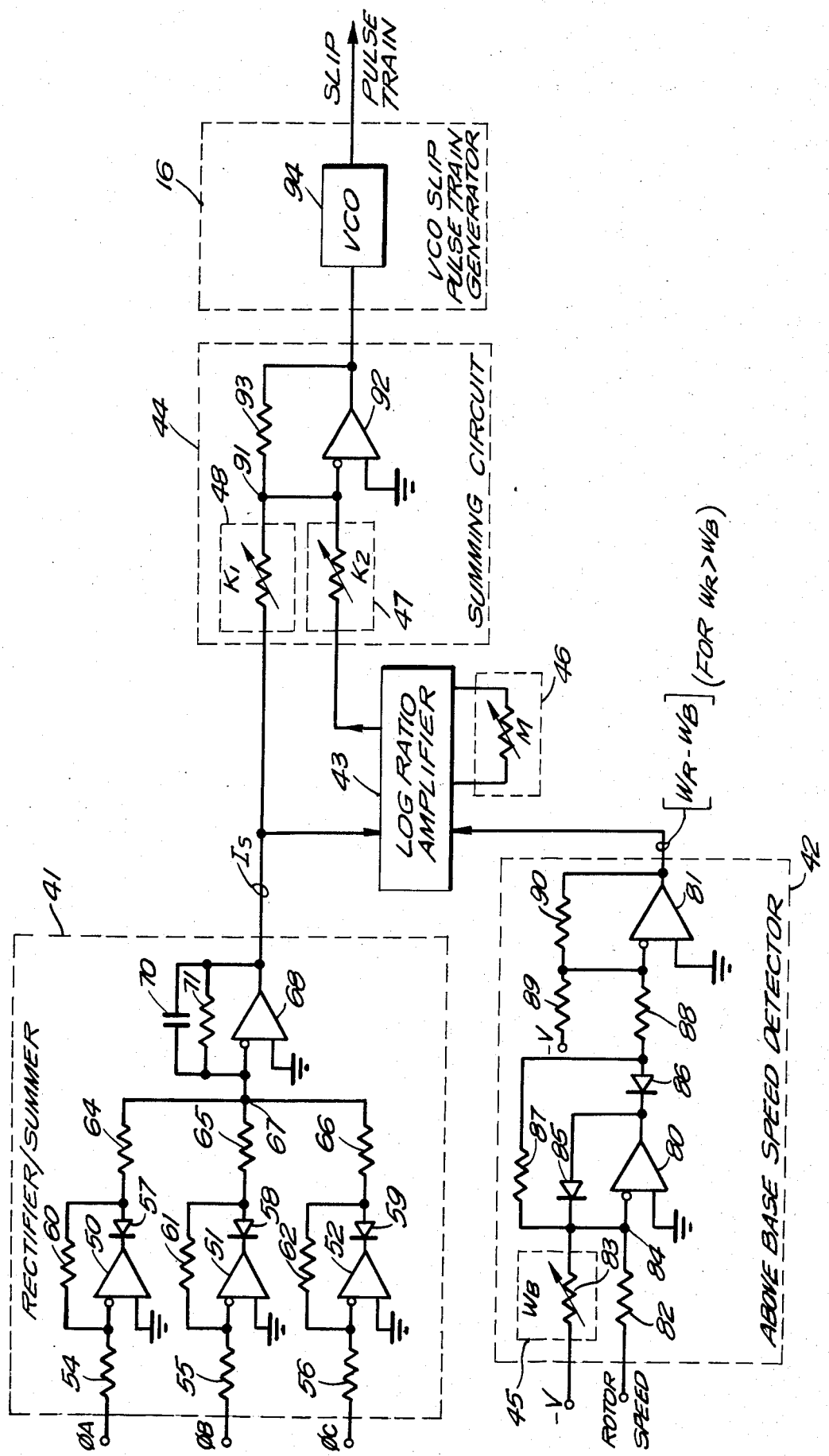
FIG. 2 is a schematic diagram illustrating details of the preferred slip generating circuits.

Circuits 16 and 41-48 appearing in the block diagram of FIG. 1 are shown in more detail schematically in FIG. 2.

Rectifier/summing circuit 41 receives the current signals for the respective phases from current sensors 36-38 (FIG. 1). The signals are supplied to the inverted inputs of operational amplifiers 50-52 via input resistors 54-56, respectively (FIG. 2). The cathodes of diodes 57-59 are connected to the outputs of the operational amplifiers to rectify the output signals. Resistors 60-62 are connected across the operational amplifiers to provide the required feedback. The rectified signals are then coupled to a summing junction 67 via input resistors 64-66 and the summing junction, in turn, is connected to the inverting input of operational amplifier 68. The parallel combination of capacitor 70 and resistor 71 are connected across operational amplifier 68 to provide the required feedback and to smooth the output signal. Thus, the signals representing current for the various phases are rectified and then summed to provide a DC signal $I_S$ at the output of circuit 41 representing stator current magnitude.

The above base speed detector circuit 42 includes operational amplifiers 80 and 81 both having their non-inverting inputs connected to ground. The signal representing rotor speed is supplied to a summing junction 84 via an input resistor 82, the summing junction in turn being connected to the inverting input of amplifier 80. A signal representing base speed is also supplied to summing junction 84, this being achieved by a variable resistor 83 connected between the summing junction and a source voltage $-V$. Resistor 83 is set to a value such that the current supply to summing junction 84 represents the base speed setting $W_B$. The cathode of a diode 85 is connected to summing junction 84 and the anode thereof is connected to the output of the amplifier. The cathode of a diode 86 is also connected to the output of the amplifier and feedback resistor 87 is connected between summing junction 84 and the anode of diode 86. The output from the circuit including amplifier 80 is supplied to the inverting input of amplifier 81 via an input resistor 88. Feedback resistor 90 is connected across amplifier 81 so that the circuit functions as an inverter. A resistor 89 connected between the summing junction and a negative source provides a small offset voltage.

Diodes 85 and 86 maintain the output of amplifier 80 at zero until such time as the rotor speed exceeds the base speed. Thereafter, the output from amplifier 80 represents the difference between rotor speed and base speed. The circuit including amplifier 81 inverts the signal and provides a small offset so that the output signal never goes negative. This offset potential is required for proper operation of the log ratio amplifier 43.

The log ratio amplifier receives the current signal $I_S$ from circuit 41 and the speed difference signal from circuit 42. In addition, the circuit sees a resistance in circuit 46 representing the value M. The log ratio amplifier is a conventional integrated circuit such as type LH0094. Circuit 43 multiplies the current signal $I_S$ by the speed difference signal from circuit 42 raised to the power represented by the value M.

The outputs from circuits 41 and 43 are added in summing circuit 44. Specifically, the output of log ratio amplifier 43 is supplied to summing junction 91 via a variable input resistor 48 set to represent the constant $K_2$. The output from circuit 41 representing the value $I_S$ is supplied to summing junction 91 via a variable resistor 47 which is set to a value representing the constant $K_1$. Summing junction 91 is connected to the inverting input of amplifier 92, the non-inverting input thereof being connected to ground. A resistor 93 is connected across the amplifier to provide feedback. The output from circuit 44 thus represents an analog signal corresponding to slip.

The output of circuit 44 is supplied to the VCO slip pulse train generator 16 which includes a voltage controlled oscillator (VCO) 94. Oscillator 94 provides a pulse train wherein the repetition rate corresponds to the applied voltage. This pulse train is referred to as the "slip pulse train".

We claim:

1. A servo control system for an AC induction motor comprising:
   a servo loop responsive to the speed of the AC induction motor and a desired speed indication to provide an error signal proportional to the difference between said speed indications;
   means providing a speed pulse train having a repetition rate proportional to the speed of the AC induction motor;
   a slip pulse generator for providing a slip pulse train, said slip pulse generator being
   responsive to an indication of motor excitation current, and
   to motor speed, so that
   the repetition rate of said slip pulse train is a function of both motor current and motor speed;
   means providing a digital rotating vector indication in accordance with the summation of said speed pulse train and said slip pulse train; and
   conversion means for providing a synthesized sine wave excitation for the AC induction motor
   in accordance with the phase and frequency of said vector indication, and
   with an amplitude proportional to said error signal.

2. In a servo control system according to claim 1 wherein said repetition rate of said slip pulse train is a linear function of excitation current below base speed for the motor and increases exponentially above base speed.

* * * * *